United States Patent [19]

Harris et al.

[11] 4,011,771
[45] Mar. 15, 1977

[54] STEERING RANGE SELECTOR

[75] Inventors: Charles V. Harris, Cerritos; Lowell F. Pickett, Los Alamitos; George A. Schlanert, Tustin, all of Calif.

[73] Assignee: McDonnell Douglas Corporation, Long Beach, Calif.

[22] Filed: Oct. 16, 1975

[21] Appl. No.: 622,955

[52] U.S. Cl. .................................. 74/522; 74/470; 74/491; 244/50

[51] Int. Cl.² .................... G05G 7/04; B64C 25/50

[58] Field of Search ........... 74/470, 516, 517, 518, 74/522, 491; 244/50

[56] References Cited
UNITED STATES PATENTS

| 2,796,774 | 6/1957 | Peed, Jr. | 74/516 X |
| 2,997,888 | 8/1961 | Rust, Jr. | 74/522 X |
| 3,330,477 | 7/1967 | Stephens | 74/522 X |
| 3,753,540 | 8/1973 | Renner | 244/50 |

Primary Examiner—Allan D. Herrmann
Attorney, Agent, or Firm—G. W. Finch; W. J. Jason; D. L. Royer

[57] ABSTRACT

A selectable dual ratio connection between the rudder pedals and the control elements of an aircraft for steering the aircraft by means of the nose mounted landing gear wheel thereof. The connection includes a control arm and a control segment selectively related either by a link, walking beam and bungee or by means of a pivoting link mechanism. The arm and segment are rotatably mounted upon axes that coincide with the pivoting link mechanism which in one position locks the arm and the segment together while in another position enables differential motion therebetween.

19 Claims, 6 Drawing Figures

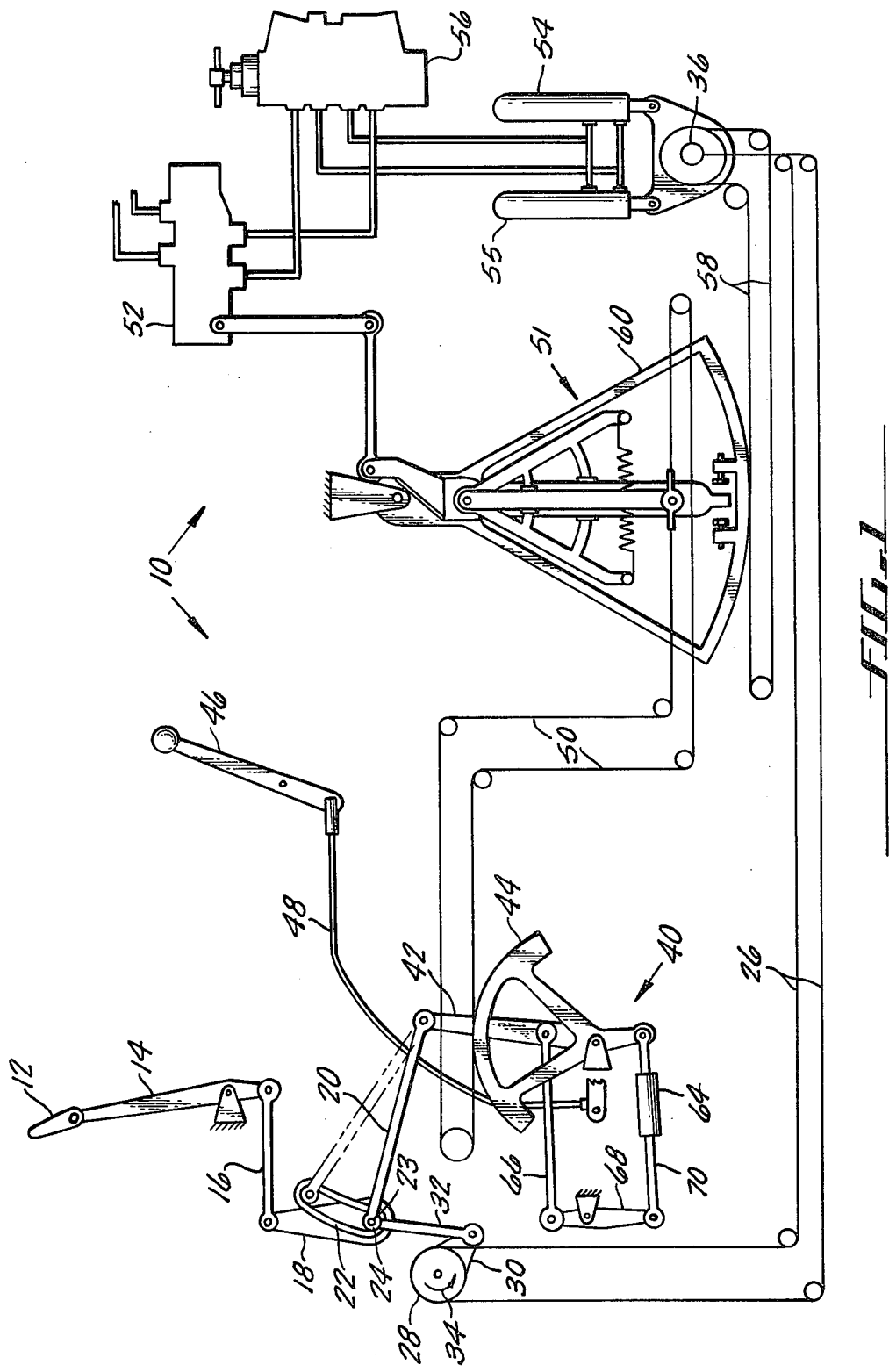

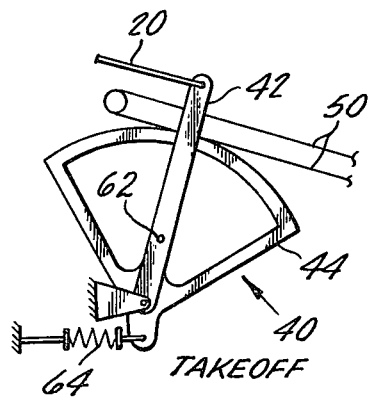
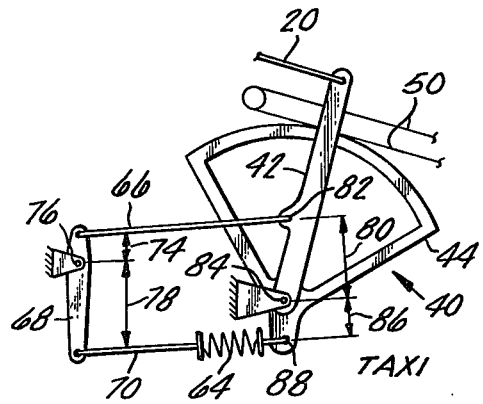
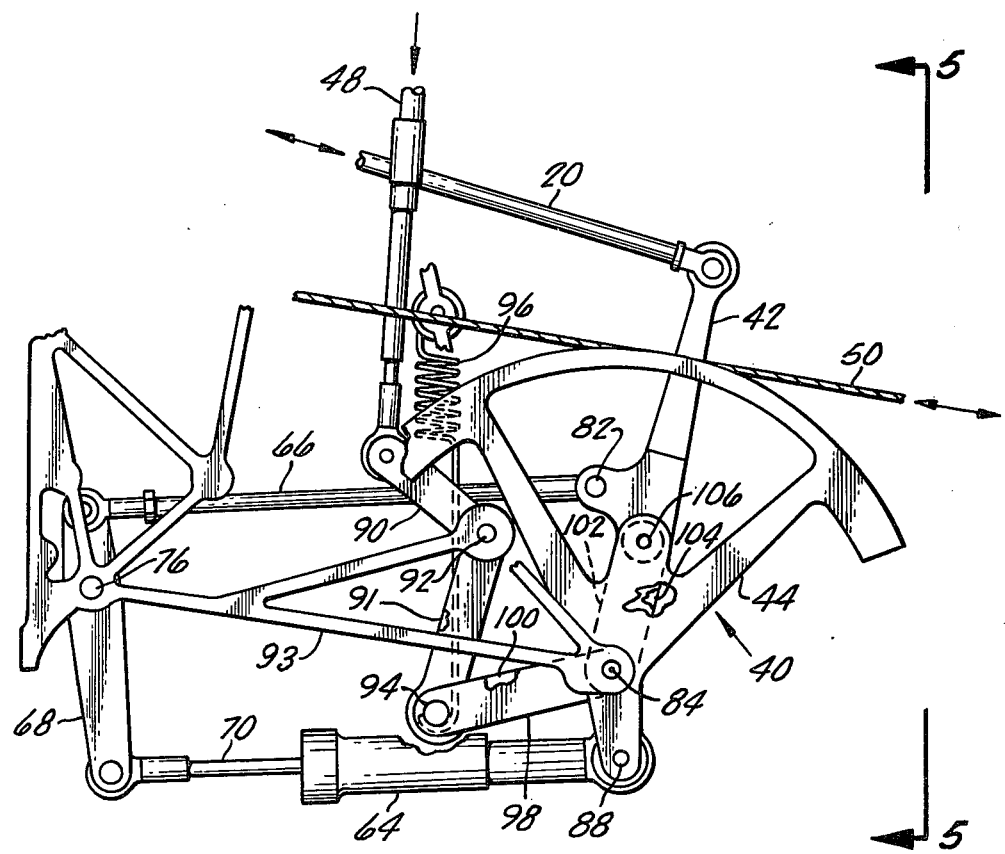

STEERING RANGE SELECTOR

The invention herein described was made in the course of or under a contract or subcontract thereunder, with the Department of the Air Force.

BACKGROUND OF THE INVENTION

Positive control of the steering angle of the nose landing gear wheel is mandatory for precise ground maneuvering of any modern aircraft. A small maximum nose wheel turning angle is desirable for high aircraft speeds such as occur during takeoff and landing runs, while a large maximum nose wheel turning angle is necessary for low speed taxiing and parking operations.

Conventional practice with small airplanes is to connect the rudder pedals of the aircraft to the nose wheel through light bungees or springs. Therefore, when contra turning forces are low such as during taxi operations, the nose wheel can be turned through large angles whereas at high speed operations where the contra turning forces are high, the bungees supply relatively small forces to the wheel which result in relatively small turning angles.

For large aircraft, where the nose wheel must be powered by some sort of auxiliary means, such a solution has not been practical and two separate controls are normally used for nose wheel steering, one during taxi operations and the other during high speed operations. In this latter example the rudder pedals are operatively coupled to the nose wheel power steering to provide the small angle inputs required for high speed operation whereas a separate wheel type control is used for the large angle control inputs needed for low speed operation. Two different controls for the same function are not desirable, and the wheel control has traditionally required a rather large amount of cockpit panel or console space. Frequently, this control is accessible only to the pilot since space between the pilot and the co-pilot is normally at a premium. This is undesirable since it means that the aircraft only can be completely controlled and flown from the pilot's position.

SUMMARY OF THE INVENTION

The present dual rate nose wheel steering system uses a conventional hydraulic powered servo mechanism controlled by the rudder pedals. A variable radius crank is provided to connect the motion of the rudder pedals to the steering ratio changer mechanism which changes the rudder pedal inputs from their maximum values at the nominal nose landing gear strut compression to zero at the full nose gear strut extension. This is done by means of a connection between the nose landing gear strut and the variable radius crank. The net effect of the changing radius is to vary the steering angle available from maximum to zero causing the nose gear to automatically center as a nose gear strut extends. This centering is independent of the rudder position.

The output of the variable radius crank is connected to a steering ratio changing mechanism whose ratio, whether a high authority setting for taxi or a low authority setting for takeoff, is manually selectable by the pilot. The mechanism connects the variable radius crank to a servo mechanism for steering the nose landing gear. It includes an input control arm and an output control segment selectively related either by a link, a walking beam and a bungee, or by means of a pivoting link mechanism depending upon the steering ratio selected. The control arm and the segment are rotatably mounted upon axes that coincide. The pivoting link mechanism is comprised of two links with one end of each being pinned together to an actuating mechanism while their other ends are affixed respectively to the lever arm and the control segment. The manual actuating mechanism for the links is adapted to hold them either so the pinned ends coincide with the lever arm and the control segment's rotational axis, or in an attitude whereby the pinned ends are about 90° displaced from the axis of the control arm and the segment to lock the rotation of the control arm and the segment together. When the links are in the first mentioned position, movement of the segment by the arm is via the link, the walking beam, and the bungee.

It is therefore a primary object of the present invention to provide steering means for the nose landing gear of an aircraft which has two steering ratios, a high authority ratio for taxiing and a low authority ratio for takeoff and landing.

Another object is to provide dual ratio steering means for aircraft which are mechanical in nature, and easily and relatively economically constructed.

Another object is to provide ground steering means for an aircraft so that all directional control is obtained through the use of the rudder pedals making ground control completely instinctive with no requirement to change to different control means such as a separate nose wheel steering control.

Another object is to provide a dual rate steering mechanism for aircraft wherein the pilot has the option of selecting either high or low steering range by the operation of a mode selector lever which can be mounted in a small space and be made accessible to both pilots.

These and other objects and advantages of the present invention will become more apparent after considering the following detailed specification which covers a preferred embodiment thereof in conjunction with the accompanying drawings wherein:

BRIEF DESCRIPTION OF THE DRAWINGS

FIG. 1 is a diagrammatic view of the nose wheel steering system of an aircraft including a dual rate steering mechanism constructed according to the present invention;

FIG. 2 is a functional diagrammatic view of the ratio changing mechanism in its low authority condition;

FIG. 3 is a functional diagrammatic view of the ratio changer in its high authority condition;

FIG. 4 is a detailed view of the ratio changing mechanism in its high authority position;

DESCRIPTION OF THE SHOWN EMBODIMENTS

Figure 5:
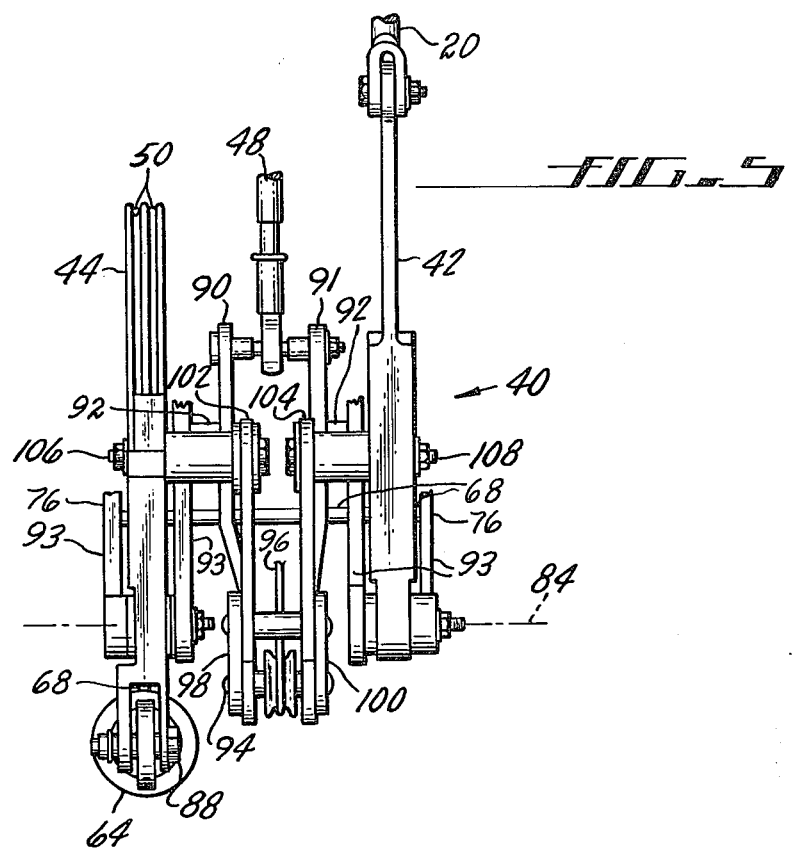
FIG. 5 is a side view of the mechanism of FIG. 4.

Referring to the drawings more particularly by reference numbers, number 10 in FIG. 1 refers to a nose wheel steering system for an aircraft. Inputs by the pilot are provided to the rudder pedals 12. These inputs are conducted by lever 14 and link 16, which are representative of a much more complex system, to a bell crank 18 whose output can be varied from 0 to a maximum value by moving the output link 20 which is connected to slide in an arcuate slot 22 upwardly from the position in alignment with the bell crank axis 23 to the position shown in dashed outline. The movement of the end 24 of the output link 20 from one end to the other of the arcuate slot 22 is accomplished by a connection including cable 26, cable drum 28 with its connected crank 30, and link 32 which attaches the end 24 to the crank 30. The cable 26 causes the drum 28 to rotate in the direction shown by the arrow 34 when the nose gear strut 36 is compressed by the weight of the aircraft and to rotate in the opposite direction when the strut 36 extends as the aircraft lifts off the ground. This changes the effective radius from which the output link 20 is driven to vary the steering angle available and to cause the nose gear to automatically center as the nose strut extends. It should be obvious that this centering is independent of the rudder position.

The output link 20 is connected to a steering ratio changing mechanism 40 which can produce a first ratio, (output/input), of movement between its input arm 42 to which the link 20 connects and its output segment 44 for takeoff or produce a greater ratio of (output/input) for ground taxiing. The choice of which ratio the mechanism 40 produces is controlled by the pilot through the use of a control handle 46 which connects to the mechanism 40 by means of push pull cable 48.

The output of the mechanism 40 is transferred from the segment 44 by means of a cable 50 to a conventional nose wheel landing gear power steering apparatus including an input and feedback mechanism 51 which controls a steering valve 52. The steering valve 52 provides hydraulic steering commands to steering cylinders 54 and 55 attached to the nose strut 36 through a protective bypass valve 56. Position feedback is accomplished by a cable 58 which connects the rotative position of the strut 36 back to a follow-up sector 60 of the mechanism 51.

The operation of the steering ratio changing mechanism can be understood by reference to FIGS. 2 and 3, FIG. 2 showing the effective configuration of the mechanism 40 for takeoff and landing while FIG. 3 shows its effective configuration during normal taxiing. As can be seen in FIG. 2, the input arm 42 and the output segment 44 act as though they were fastened together by pin 62 to form an integral part which is centered by the action of a bungee 64 connected to the segment 44. In this case, the movement ratio, (output/input), is essentially one to one, it only differing due to the different radii of the arm 42 and the segment 44.

As shown in FIG. 3, the input arm 42 connects to the output segment 44 through a link 66, a walking beam 68 and a link 70 which includes the bungee 64. In this instance movements of the input arm 42 are amplified by the ratio of the distance 74 from the pivot 76 of the walking beam 68 to its connection with link 66 and the distance 78 from the center pivot 76 to the walking beam's connection to link 70. The ratio is also increased by the ratio of the distance 80 from link 66's connection 82 to the input arm 42 and its pivot axis 84 and the distance 86 from the bungee 64's connection 88 to the output segment 44 to the axis 84. It should be obvious that the takeoff and taxi functions of the mechanism could be reversed if the distances 74, 78, 80 and 86 were also reversed.

The actual mechanism 40 is shown in its taxi position in FIG. 4. As can be seen, the push-pull cable 48 is connected to a pair of cranks 90 and 91 whose pivot 92 connected to support structure 93 is normally off center from their opposite end connection pivot 94. A spring 96 is connected to the pivot 94 which tends to retain the cranks 90 and 91 in the position shown until a suitable spring overcoming force has been applied by means of the push-pull cable 48. The cranks 90 and 91 are connected to a pair of links 98 and 100. The opposite ends of the links 98 and 100 are connected to links 102 and 104 on the axis 84 when the mechanism 40 is in the position shown in FIGS. 4 and 5. The link 102 is pivotally connected to the segment 44 while the link 104 is pivotally connected to the input arm 42 by bolts 106 and 108 respectively. Since the links 102 and 104 both pivot about the same axis 84 that the segment 44 and the input arm 42 rotate about, the arm 42 and the segment 44 are free to rotate differentially and do so with a relatively high ratio of (output/input) motion generated by the connection therebetween comprised of link 66, walking beam 68, link 70, and bungee 64.

Figure 6:
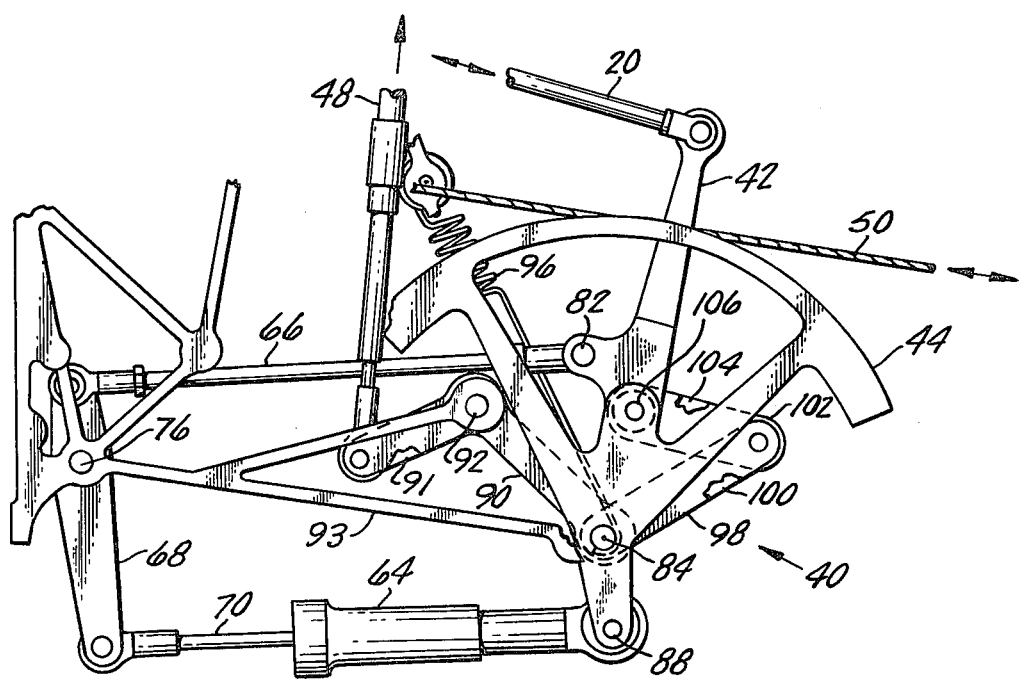
FIG. 6 is a detailed view of the mechanism shown in FIG. 4 in its low authority position.

When the push-pull cable 48 moves the cranks 90 and 91 downwardly until the spring 96 causes them to go over center as shown in FIG. 6, the connection between links 98 and 102, and 100 and 104 is moved out of alignment with axis 84 thereby constraining the input arm 42 and the output segment 44 to move in unison with the differential movement of the linkage being absorbed in the bungee 64.

Thus there has been shown and described a novel steering range selector for providing a dual steering ratio to the nose gear of an aircraft which fulfills all of the objects and advantages sought therefor. Any changes, alterations, and other uses and applications of the subject dual ratio steering range selector will become apparent to those skilled in the art after considering the specification and the accompanying drawings. All such changes, modifications, variations and other uses and applications which do not depart from the spirit and scope of this invention are deemed to be covered by the invention which is limited only by the claims that follow.

What is claimed is:

1. In a control system for a steerable wheel on an aircraft, selectable means for changing the ratio of inputs thereto to outputs therefrom, said means including:
   input motion receiving means;
   output motion transmitting means;
   selectably engageable and disengageable linkage means to restrain said output motion transmitting means to move at a first predetermined ratio with respect to said input motion receiving means; and
   resilient linkage means connected between said input motion receiving means and said output motion transmitting means, said resilient linkage means being sized to urge said output motion transmitting means to move at a second predetermined ratio with respect to said input motion receiving means when said selectably engageable and disengageable linkage means are disengaged.

2. The means defined in claim 1 wherein said input motion receiving means and said output motion transmitting means are pivoted on a common axis.

3. The means defined in claim 2 wherein said selectably engageable and disengageable linkage means include:
   a first link pivotably connected to said input motion receiving means;
   a second link pivotably connected to said output motion transmitting means;
   a pivot which connects said first and second links together and being positioned to be alignable with the common axis of said input motion receiving means and said output motion transmitting means; and means to selectably align and disalign said pivot from the common axis.

4. The means defined in claim 3 wherein said means to selectably align and disalign said pivot from the common axis include:
a lever pivoted to a fixed location, said lever having a first end connected to said pivot which connects said first and second links together;
resilient means connected to said lever to urge said lever into two stable positions, the first positioning said pivot in alignment with the common axis and the second positioning said pivot out of alignment with the common axis; and
means connected to said lever to move said lever between the two stable positions.

5. The means defined in claim 4 wherein said means connected to said lever to move said lever between the two stable positions include:
a push pull-cable connected to said lever.

6. The means defined in claim 4 wherein said resilient linkage means include:
a beam (68);
a pivot connected to said beam to enable said beam to rotate about a fixed position; and
means including a center loaded bungee connecting said beam to said input motion receiving means and said output motion transmitting means; said beam having different lengths (74, 78) from said pivot to said last named means than the lengths (80, 86) of said input motion receiving means and said output motion transmitting means from their common axis.

7. The means defined in claim 6 wherein said means including a center loaded bungee include:
a first rod connected between said beam and said input motion receiving means; and
a second rod connected between said beam and said output motion transmitting means.

8. The means defined in claim 7 wherein said resilient linkage means beam has a length between said beam pivot and said connected first rod which is smaller than the length between said beam pivot and said connected second rod.

9. The means defined in claim 8 wherein said length of said input motion receiving means between the common axis and said connection to said first rod is larger than the length between said beam pivot and said connected first rod.

10. The means defined in claim 9 wherein said length of said output motion transmitting means between the common axis and said connection to said second rod is smaller than the length between said beam pivot and said connected second rod and is smaller than the distance between said input motion receiving means and the common axis.

11. The means defined in claim 7 wherein said second rod includes said center loaded bungee.

12. The means defined in claim 7 wherein said input motion receiving means are an arm member pivoted about the common axis and said output motion transmitting means are a cable segment pivoted about the common axis.

13. The means defined in claim 2 wherein said resilient linkage means include:
a member (68);
a pivot connected to said member to enable said member to rotate about a fixed position; and
means including a center loaded bungee connecting said member to said input motion receiving means and said output motion transmitting means; said member having different lengths (74, 78) from said pivot to said last named means than the lengths (80, 86) of said input motion receiving means and said output motion transmitting means from their common axis.

14. The means defined in claim 13 wherein said means including a center loaded bungee include:
a first rod connected between said member and said input motion receiving means; and
a second rod connected between said member and said output motion transmitting means.

15. The means defined in claim 14 wherein said resilient linkage means member has a length between said member pivot and said connected first rod which is smaller than the length between said member pivot and said connected second rod.

16. The means defined in claim 15 wherein said length of said input motion receiving means between the common axis and said connection to said first rod is larger than the length between said member pivot and said connected first rod.

17. The means defined in claim 16 wherein said length of said output motion transmitting means between the common axis and said connection to said second rod is smaller than the length between said member pivot and said connected second rod and is smaller than the distance between said input motion receiving means and the common axis.

18. The means defined in claim 14 wherein said second rod includes said center loaded bungee.

19. The means defined in claim 14 wherein said input motion receiving means are an arm member pivoted about the common axis and said output motion transmitting means are a cable segment pivoted about the common axis.

* * * * *